United States Patent [19]
Cardwell, Jr.

[11] Patent Number: 6,154,383
[45] Date of Patent: Nov. 28, 2000

[54] POWER SUPPLY CIRCUIT FOR AN ION ENGINE SEQUENTIALLY OPERATED POWER INVERTERS

[75] Inventor: Gilbert I. Cardwell, Jr., Palos Verdes Peninsula, Calif.

[73] Assignee: Hughes Electronics Corporation, El Segundo, Calif.

[21] Appl. No.: 09/351,572

[22] Filed: Jul. 12, 1999

[51] Int. Cl.[7] .............................. H02M 1/12; H02M 1/14; H02M 7/00
[52] U.S. Cl. .................................. 363/71; 363/41
[58] Field of Search ................... 363/70, 71, 41, 363/98, 132, 134

[56] References Cited

U.S. PATENT DOCUMENTS

| | | | |
|---|---|---|---|
| 3,491,250 | 1/1970 | Shoh ........................................ | 363/71 |
| 3,697,717 | 10/1972 | Kornrumpf et al. ..................... | 363/71 |
| 3,786,334 | 1/1974 | Johannessen ............................. | 363/71 |
| 4,290,101 | 9/1981 | Hergenham .............................. | 363/65 |
| 4,386,311 | 5/1983 | Bafaro ...................................... | 363/71 |
| 4,533,836 | 8/1985 | Carpenter, et al. ...................... | 363/17 |
| 4,695,933 | 9/1987 | Nguyen, et al. ......................... | 363/71 |
| 4,825,646 | 5/1989 | Challoner et al. ....................... | 60/202 |
| 5,269,131 | 12/1993 | Brophy ..................................... | 60/202 |
| 5,369,953 | 12/1994 | Brophy ..................................... | 60/202 |
| 5,434,770 | 7/1995 | Driefuerst, et al. ...................... | 363/71 |
| 5,451,962 | 9/1995 | Steigerwald ............................. | 363/17 |
| 5,576,940 | 11/1996 | Steigerwald, et al. .................. | 363/17 |
| 5,610,452 | 3/1997 | Shimer et al. ............................ | 307/89 |
| 5,657,217 | 8/1997 | Watanabe et al. ....................... | 363/71 |
| 5,666,278 | 9/1997 | Ng et al. .................................. | 363/71 |
| 5,853,555 | 12/1998 | Martin ...................................... | 363/71 |
| 5,862,041 | 1/1999 | Martin ...................................... | 363/71 |
| 5,862,042 | 1/1999 | Jiang ........................................ | 363/17 |
| 5,875,103 | 2/1999 | Bhagwat, et al. ........................ | 363/71 |
| 5,923,549 | 7/1999 | Kobayashi, et al. .................... | 363/17 |
| 5,930,122 | 7/1999 | Moriguchi, et al. ..................... | 363/17 |
| 5,949,688 | 9/1999 | Schweighofer .......................... | 363/71 |
| 5,991,179 | 11/1999 | Schweighofer .......................... | 363/71 |

OTHER PUBLICATIONS

Thomas A. Bond et. al., "NSTAR Ion Engine Power Processor Unit Performance: Ground Test and Flight Experience", SAE Paper 99APSC–47, Apr. 1999.

Thomas A. Bond et. al., "The NSTAR Ion Propulsion Subsystem for DS1", AIAA Joint Propulsion Conference, AIAA Paper 99–2972, Jun. 23, 1999.

John A. Hamley et. al, "The Design and Performance Characteristics of the NSTAR PPU and DCIU", AIAA/ASME/SAE/ASEE Joint Propulsion Conference & Exhibit, $34^{th}$, Cleveland, OH, Jul. 13–15,1998, AIAA Paper 98–3938.

*Primary Examiner*—Adolf Deneke Berhane
*Assistant Examiner*—Bao Q. Vu
*Attorney, Agent, or Firm*—Bradley K. Lortz; Vijayalakshmi D. Duraiswamy; Michael W. Sales

[57] ABSTRACT

A power supply circuit for an ion engine suitable for a spacecraft has a voltage bus having input line and a return line. The power supply circuit includes a pulse width modulation circuit. A plurality of bridge inverter circuits is coupled to the bus and the pulse width modulation circuit. The pulse width modulation circuit generates operating signals having a variable duty cycle. Each bridge inverter has a primary winding and a secondary winding. Each secondary winding is coupled to a rectifier bridge. Each secondary winding is coupled in series with another of the plurality of rectifier bridges.

24 Claims, 3 Drawing Sheets

POWER SUPPLY CIRCUIT FOR AN ION ENGINE SEQUENTIALLY OPERATED POWER INVERTERS

RELATED APPLICATIONS

The present invention relates to U.S. application Ser. No. 09/351,738 entitled "Power Supply Circuit For An Ion Engine" and U.S. application Ser. No. 09/352,011 entitled "Starter Circuit For An Ion Engine."

The invention described herein was made in the performance of work under NASA Contract Number NAS3-27560 and is subject to the provisions of Section 305 of the National Aeronautics and Space Act of 1958 (72 Stat. 435; 42U.S. C 2457).

TECHNICAL FIELD

The present invention relates generally to an ion propulsion system, and in particular to a method and apparatus for supplying electrical power to an ion engine.

BACKGROUND OF THE INVENTION

For over thirty years, ion engines have been proposed for propulsion of vehicles in space. Outside of space propulsion, ion generation may also be applied to various types of materials processing systems involving ion sources, such as for ion beam etching or micromachining. Ion engines use movement of ions to provide thrust.

Generally, an ion engine has an ion accelerator system that uses an anode, a cathode, a screen grid and an accelerator grid coupled within a thruster housing. Generally, an ion engine works by generating an inert gas plasma within the thruster housing. Xenon is an example of a suitable gas. A charge within the plasma between the anode and cathode forms ions. The inert gas ions leave the thruster through the charged screen and accelerator. The net force from the ions leaving the thruster housing generates a thrust. A neutralizer is located outside the thruster housing and generates electrons. The electrons are attracted to the ions so the ions do not re-enter the thruster housing as they otherwise would in space.

A number of power supplies are used to power the various components of the system. Heaters, the accelerator, the screen, the anode and cathode of the thruster, and the anode and cathode of the neutralizer each have separate power supplies. The power supply for the screen processes a majority of the power of the spacecraft. A wide extreme of power and voltage supplied by the spacecraft bus varies significantly. Particularly as a spacecraft moves further from the sun, the amount of load also varies. The ratio of the output to input voltage may be as high as 4:1.

Various other known designs for supplying power over a wide dynamic performance range include using a single stage high-power inverter designed for the worst case voltage and power conditions. A single stage design has a minimum number of parts and good efficiency when operating near the maximum design point. However, when the system does not operate near its design point, thermal stresses are created due to the heat dissipation that is concentrated in a few large components requiring massive heat sinks. High stress levels on the semi-conductors for voltage, current and temperature work against reliability for single stage power processing. As the power level is decreased away from the design point, efficiency drops.

It is therefore an object of the invention to provide a power supply system that operates reliably over a wide dynamic range of performance while maintaining good efficiency over the dynamic range.

SUMMARY OF THE INVENTION

It is therefore one object of the invention to provide a power supply system that operates reliably over a wide dynamic range. It is a further object of the invention to provide a module that is capable of operating at lower power and lower stress levels as well as higher power and high stress levels and that spreads power distribution over a large area to reduce stress.

In one aspect of the invention, a power supply circuit includes a voltage bus having input line and a return line. The power supply circuit includes a pulse width modulation circuit. A plurality of bridge inverter circuits is coupled to the bus and the pulse width modulation circuit. The pulse width modulation circuit generates operating signals having a variable duty cycle. Each bridge inverter has a primary winding and a secondary winding. Each secondary winding is coupled to a rectifier bridge. Each secondary winding is coupled in series with another of the plurality of rectifier bridges.

In a further aspect of the invention, the plurality of bridge inverters includes at least two bridge inverters; a first bridge inverter and a second bridge inverter. The first bridge inverter is activated by increasing the duty of the pulse width modulation circuit. When the duty cycle becomes one hundred percent, the second bridge inverter circuit is activated. The output of the power supply circuit may be controlled by varying the duty cycle of the bridge inverter circuit that is not at one hundred percent duty cycle.

In a further aspect of the invention, a method for controlling a power supply circuit having at least a first inverter and a second inverter circuit comprises the steps of:

controlling a first inverter circuit using a first output signal of a pulse width modulating circuit, said first output signal having a first duty cycle;

increasing the first duty cycle;

after the first circuit is operating at a substantially 100 percent duty cycle, controlling a second inverter circuit using a second output signal of a pulse width modulating circuit, said second output signal having a second duty cycle;

increasing the second duty cycle to attain a predetermined voltage.

One advantage of the invention is that by using various stages in the power supply, an element of redundancy is built into the circuit. This element of redundancy is particularly desirable for space missions.

Other features and advantages of the invention are readily apparent from the following detailed description of carrying out the invention when taken in connection with the accompanying drawings.

DESCRIPTION OF THE PREFERRED EMBODIMENTS

Figure 1:
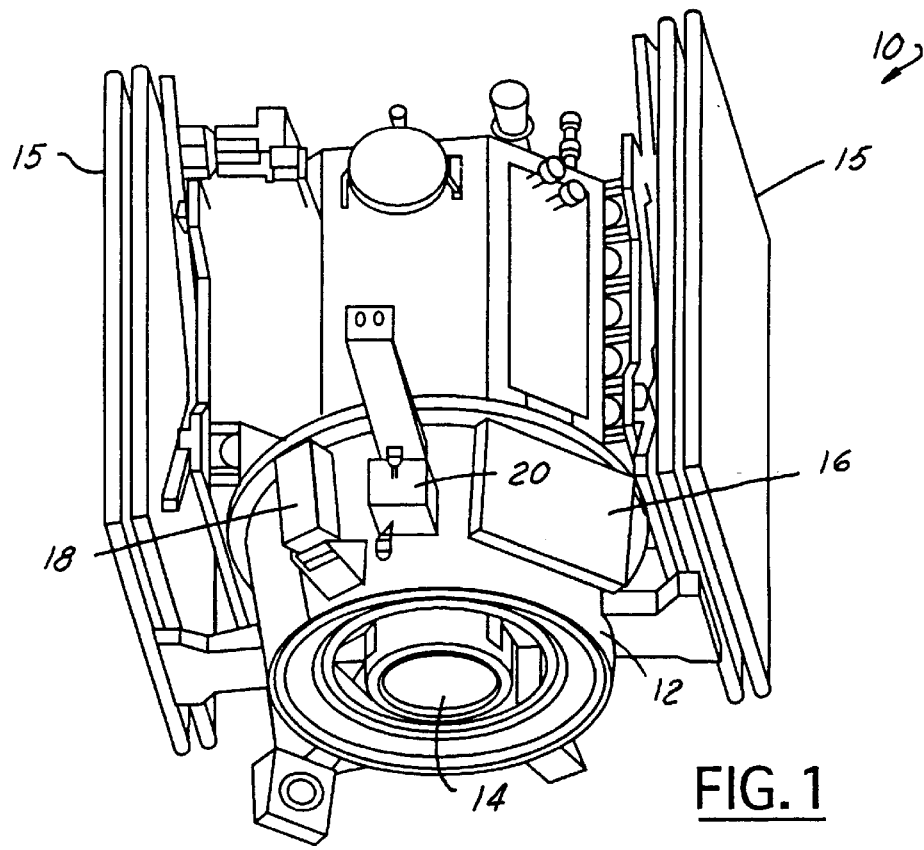
FIG. 1 is a perspective view of a spacecraft having a power supply circuit according to the present invention.
Figure 2:
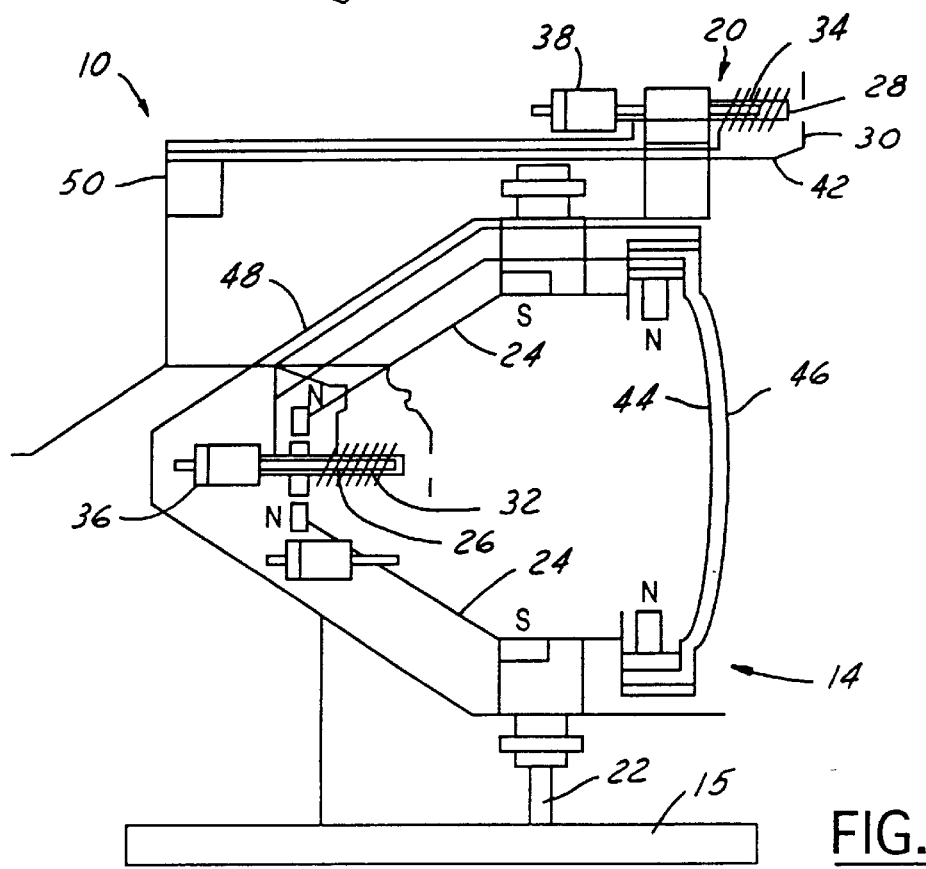
FIG. 2 is a cross sectional view of an ion thruster having a power supply according to the present invention.

In the following description, identical reference numerals are used to identify identical components in the various figures. The present invention is particularly suitable for use in a spacecraft. The power supply circuit of the present invention is also useful in other applications that have a wide dynamic range of system operability including a varying load or input. The present invention is also applicable to other systems that include ion sources such as materials processing equipment like ion beam etching or micromachining.

Referring now to FIG. 1, a spacecraft 10 has a thruster housing 12 that houses an ion thruster 14. Spacecraft 10 further includes solar panels 15 as a source of electrical power. In the present invention, spacecraft 10 is powered by xenon ions which are generated in ion thruster 14. Spacecraft 10 includes a xenon feed subsystem 16 supplying xenon to thruster 14. A digital interface and control unit (DCIU) 18 is also coupled to the thruster housing 12.

A neutralizer 20 is also coupled to thruster housing 12 and xenon feed subsystem 16. As will be further described below, neutralizer 20 generates electrons to neutralize the positive ions emitted by thruster 14.

Thruster 14 generally includes an anode 24 and a cathode 26. Neutralizer 20 also includes an anode 28 and a cathode 30. Cathodes 26, 30 each have a respective heater 32, 34. Thruster 14 and neutralizer 20 also include a respective xenon source 36, 38 that are part of xenon feed subsystem 16. A keeper 40, 42 for concentrating the stream of xenon (ions or electrons) may also be provided near respective cathodes 26, 30.

Thruster 14 further includes a screen grid 44 and an accelerator grid 46. Both screen grid 44 and accelerator grid 46 are formed of an electrically conductive mesh material.

A plasma screen 48 may be used to enclose thruster 14 on sides other than where screen 44 and accelerator 46 are positioned. Plasma screen 48 is used to capture and prevent spalling of ion sputtered grid material.

A power supply circuit 50 is incorporated into spacecraft circuitry. Power supply circuitry 50 is coupled to anodes 24, 28, cathodes 26, 30, heaters 32, 34, screen grid 44 and accelerator 46.

Figure 3:
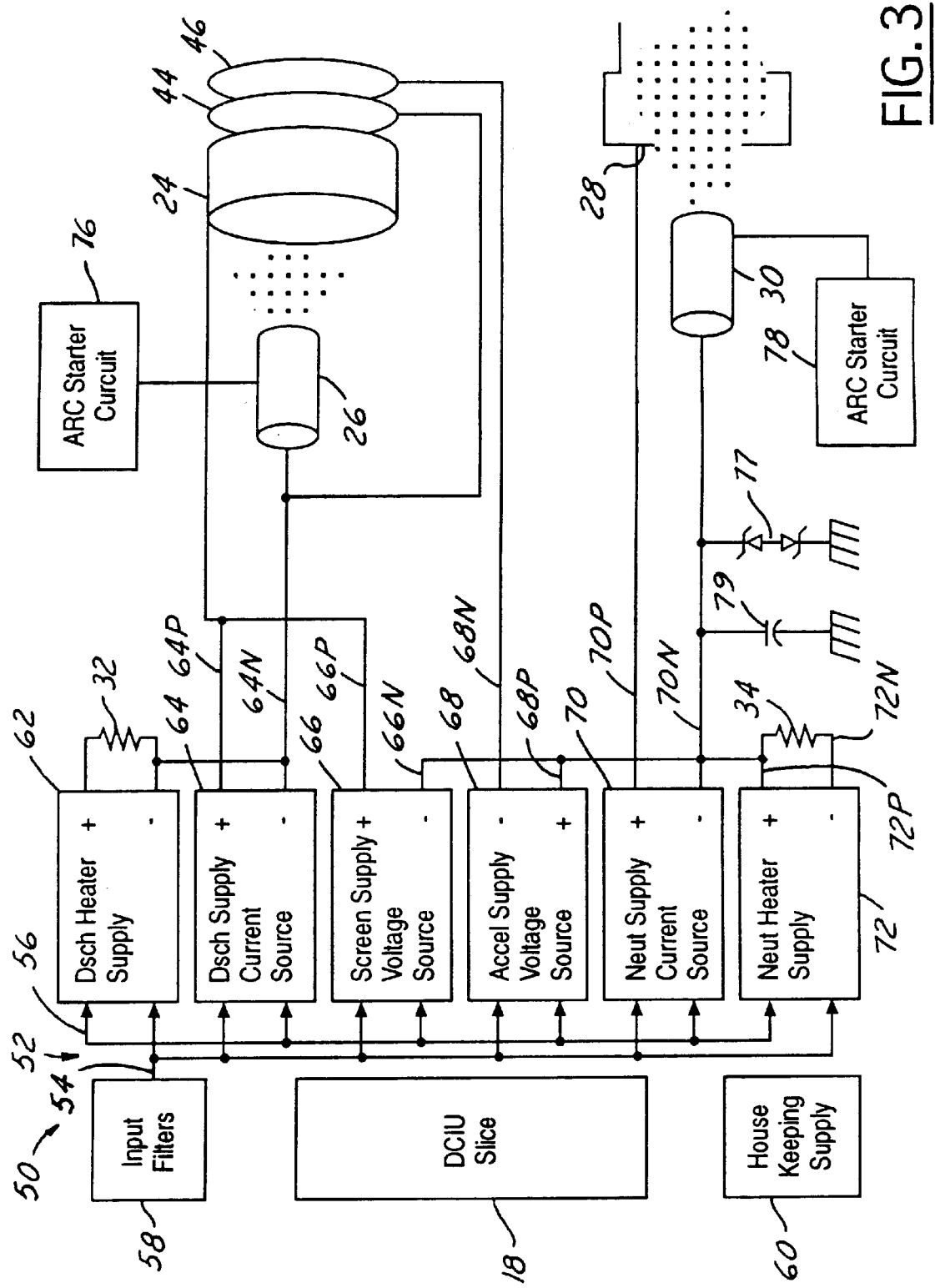
FIG. 3 is a block diagram of a power supply system according to the present invention.

At a high level of operation, xenon sources 36, 38 are used to generate a plasma of xenon adjacent to cathodes 26, 30, respectively. Heaters 32, 34 are used to heat the xenon plasma upon start up. An arc starter circuit shown in FIG. 3 is used to ignite the xenon plasma. Thruster 14 uses the xenon ions for thrust. As the xenon ions pass through screen 44 and accelerator grid 46, thrust is created. Neutralizer 20 generates a xenon plasma as well. However, the goal of neutralizer 20 is to generate electrons that are used to electrically balance the xenon positive ions in space to prevent the xenon ions from being attracted back to the spacecraft.

Referring now to FIG. 3, power supply circuit 50 is illustrated in greater detail. A central spacecraft bus 52 couples the base components of power supply circuit 50 together. Spacecraft bus 52 includes a bus input 54 and a bus return 56.

Input filters 58 may be coupled to spacecraft bus 52 to reduce electrical noise. Input filters 58 may take the form of capacitors or other circuit components as would be evident to those skilled in the art.

The control of the power supply circuit 50 is controlled by DCIU 18. DCIU 18 is also coupled to bus 52. A housekeeping supply 60 may also be incorporated into power supply circuit 50. Housekeeping supply 60 may be used for other functions besides a centralized system and may not be coupled to bus 52.

Power supply circuit 50 includes a plurality of application specific power supplies. The application specific power supplies are sized in terms of current and voltage based on the specific components to which they are connected. The specific power supplies may include a discharge heater supply 62, discharge supply current source 64, screen supply voltage source 66, an accelerator supply voltage source 68, a neutral supply current source 70, and a neutral heater supply 72. Discharge heater supply 62 is coupled to heater 32 and is disposed within thruster 14. Discharge supply current source 64 has a positive output 64P coupled to anode 24. Discharge supply current source 64 also has a negative output coupled to cathode 26. Negative output may also be coupled to screen grid 44. Screen supply voltage source 66 has a positive output 66P that may also be coupled to anode 24. Accelerator supply voltage source 68 has a negative terminal coupled to accelerator 46. Neutral supply current source 70 has a positive output 70P coupled to neutralizer anode 28. Neutralizer supply current source has a negative output 70N coupled to neutralizer cathode 30. A filter capacitor 79 and a voltage clamp 77 may be coupled to negative output 77 of neutralizer supply 70. Neutral heater supply 72 is coupled to heater 34. Neutral heater supply 72 has a positive output 70P and a negative output 70N.

A negative output 66N of screen supply voltage source 66, a positive output 68P of accelerator supply voltage source 68, a negative output 70N of neutralizer supply current source 70 and negative output 72N of neutralizer heater supply 72 may all be coupled together at the same electrical potential. Discharge arc starter circuit 76 and a neutralizer arc starter circuit 78 may be coupled to cathodes 26, 30 respectively. As described above, arc starter circuits 76, 78 are used to ignite the ion plasma.

Figure 4:
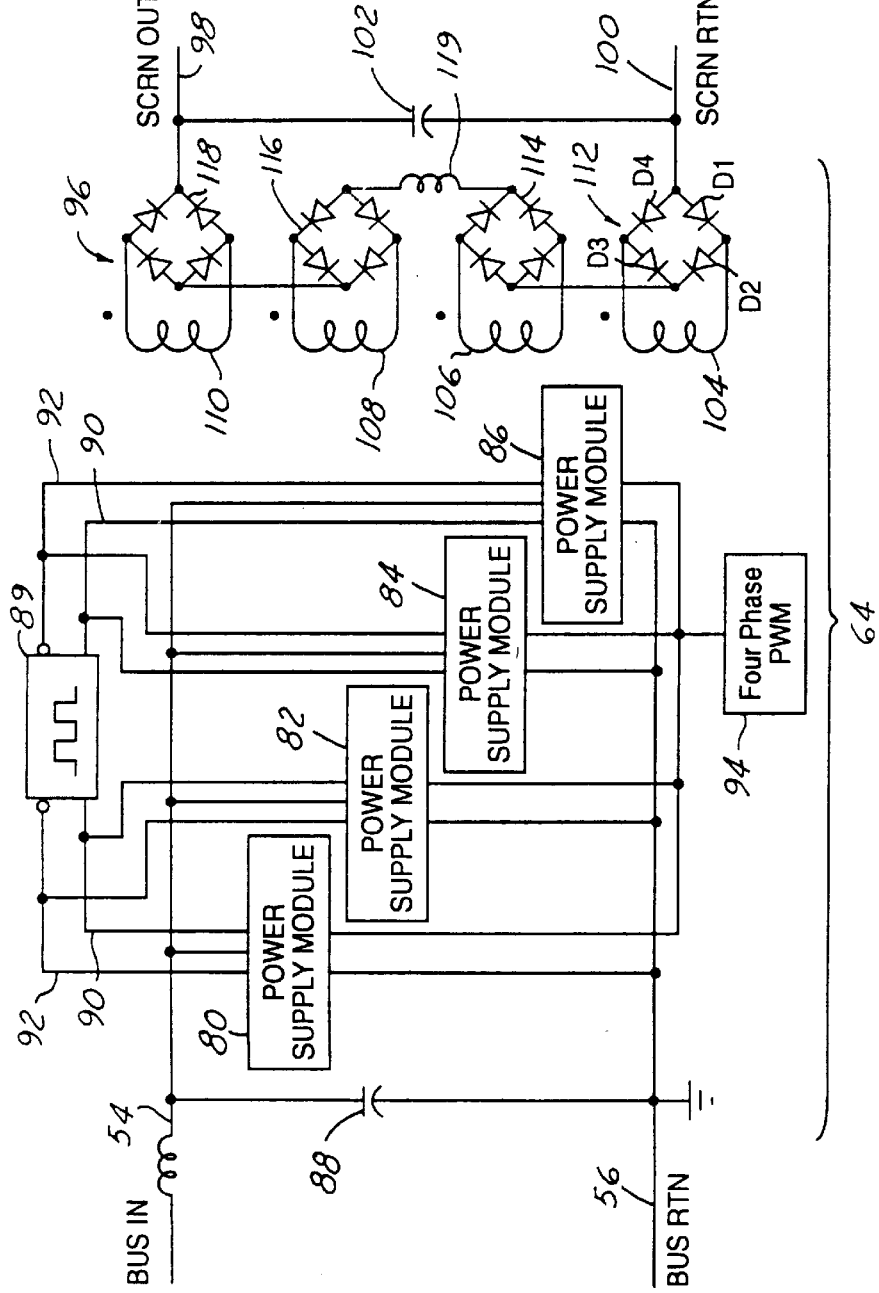
FIG. 4 is a block diagram of the screen supply voltage source of FIG. 3.

Referring now to FIG. 4, discharge supply current source 64 that is coupled to screen 44 uses about eighty percent of the power of the spacecraft. Extreme conditions may also exist wherein an 80 volt DC input may be used to generate 110 volt DC output. Because of these conditions, and the drawbacks described above with respect to prior designs, discharge supply current source 64 has been broken up into four power supply modules 80, 82, 84, and 86 that are sequentially operated. Each module 80, 82, 84 and 86 is coupled between bus input 54 and bus return 56. Bus return 56 is at spacecraft ground potential.

An input filter 88 is coupled between bus input 54 and bus return 56. Input filter 88 may be similar to that described above in FIG. 3. However, an additional filter may be incorporated into discharge supply current source 64.

Each module 80 through 86 are coupled to a square wave source 89 that has a square wave output 90 and an inverting output 92. Both the inverting output 92 and square wave output 90 are coupled to each module 80 through 86.

Each module 80 through 86 are coupled to a four phase pulse width modulating circuit 94. Pulse width modulating circuit 94 may be used to individually control the duty cycle of the signals to each module to therefore control the amount of power supplied by each power supply module. By relatively shifting the duty cycles, the desired power output may be maintained.

Each power supply module 80 through 86 contain the primary windings of a transformer circuit. For simplicity, a secondary winding circuit 96 has a screen output 98 and a screen return 100. An output capacitor 102 may be coupled between screen output 98 and screen return 100. Output capacitor 102 is used for filtering. As will be further described below output capacitor 102 is sized to reduce the ripple effect from secondary winding circuit 96.

Secondary winding circuit 96 is comprised of first secondary winding 104, second secondary winding 106, third secondary winding 108 and fourth secondary winding 110. Each secondary winding 104 through 110 has a respective full wave rectifier circuit 112 through 118. Each fall wave rectifier circuit 112 through 118 is coupled in series between screen output 98 and screen return 100.

Preferably, each fall wave rectifier 18 has four diodes, D1, D2, D3, and D4. The anode of diodes D1 and D4 are coupled to screen return 100. The cathode of diode D1 and the anode of diode D2 are coupled to the secondary winding 104. The cathode of diode D2 and the cathode of diode D3 are coupled to the rectifier bridge 114 of second secondary winding 106. The anode of diode D3 and the cathode of diode D4 are coupled to the opposite end of secondary winding 104 from that of diodes D1 and D2.

Each of the rectifier bridges 112, 114, 116 and 118 are coupled in series. The series connection extends between screen return 100 and screen output 98 in a conventional manner. An inductor 119 may be used in any of the series connections. Output capacitor 102 is in parallel with the series connection of rectifier bridges 112, 114, 116 and 118. Typically, a capacitor is provided for each rectifier bridge or the capacitor is sized to accommodate each rectifier bridge. Because of the operation of the present invention, capacitor 102 need only be sized for rectification of one of bridges 112, 114, 116, 118.

Figure 5:
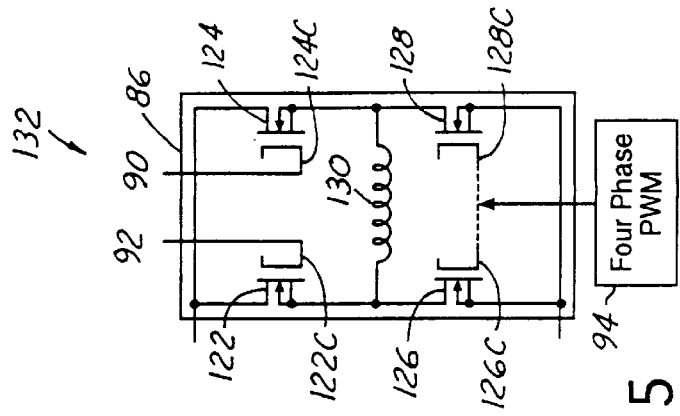
FIG. 5 is a common inverter circuit used in the schematic of FIG. 4.

Referring now to FIG. 5, a schematic of power supply module 80 is illustrated. Although only the schematic for power supply module 80 is shown, power supply modules 82, 84, and 86 are similarly configured. Power supply module 80 has four switches 122, 124, 126 and 128. Switches 122 through 128 are illustrated as field effect transistors (FET). However, various other types of transistors or switches may be evident to those skilled in the art. Switch 122 controls the coupling of bus input 54 to primary winding using a control input 122C. Control 122C is coupled to square wave output 90 of square wave generator 89.

Switch 124 selectively couples bus input 54 to primary winding 130 using control input 124C. Control input 124C is coupled to inverting output 92 of square wave generator 89. Inverting output 92 and square wave output 90 are fifty percent duty cycle signals that are 180° out of phase so that either switch 122 couples primary winding 130 to bus or switch 124 couples primary winding to bus input 54.

Switch 126 couples primary winding to bus return 56. Switch 126 is coupled to the same end of primary winding as switch 122. Switch 126 has a control input 126C that is coupled to pulse width modulator 94.

Switch 128 selectively couples the opposite end of primary winding 130 to bus return 56. A control input 128C is used to control the operation of switch 128. Switches 122, 124, 126 and 128 form an inverter circuit 132.

In operation, power supply modules 80 through 86 are sequentially phased up until a desired output voltage is obtained. Feedback from the screen output 98 forms the controller to increase or decrease the power levels based on the inputs. Because each module 80 through 86 operate most efficiently with a one hundred percent duty cycle from pulse width modulator 94, the first power supply module 80 is sequentially powered until a one hundred percent duty cycle is reached. In practice nearly a one hundred percent duty cycle may be achieved. After the duty cycle of the first power supply module is increased and more power is desired, the the output of second power supply module 82 is increased by adjusting its duty cycle until it reaches a one hundred percent duty cycle. This continues until power supply module 86 is activated or until a predetermined voltage is reached.

As each inverter circuit 132 operates, switch 122 and 128 are simultaneously activated while switch 124 and 126 are non-conducting. The square wave generator 89 controls the oppositely conducting states of switches 122 and 124. Thus, by adjusting the duty cycle of switches 126 and 128 of each of the power supply modules, the desired amount of output may be achieved.

In the present example, when 80 volts DC is present on input bus, a maximum 110 volt DC output may be achieved by providing modules 1, 2 and 3 with one hundred percent duty cycle while allowing power supply module 86 to operate at a reduced pulse width sufficient to maintain output regulation. In this case, the first three of the four power supply modules operate at maximum efficiency.

The efficiency gained in the efficiency of the secondary circuit 96 is also a feature of the invention. A signal having a ripple is generated by each power module circuit. Simultaneously, as the first power supply module 80 is being ramped up to one hundred percent duty cycle first rectifier bridge 112 operates to reduce the ripple. When power supply module 80 operates at one hundred percent duty cycle, full wave rectifier 112 is rectifying a square wave. The square wave does not need rectification. Thus, rectification is moved to the second wave rectifier 114 when the first power supply module 82 is increased to one hundred percent duty cycle. This pattern continues until rectification occurs in full wave rectifier 118 and each secondary winding 104, 106 and 108 are receiving only square waves. Consequently, output capacitor 102 need only be sized large enough to filter the output from one fall wave rectifier at a time. Thus, output capacitor 102 may be reduced in size and weight. Reducing size and weight is particularly important in spacecraft design.

While the best modes for carrying out the invention have been described in detail, those familiar with the art to which this invention relates will recognize various alternative designs and embodiments for practicing the invention as defined by the following claims.

What is claimed is:

1. A power supply circuit comprising:

a voltage bus having a input line and a return line;

a pulse width modulation circuit having a plurality of independently controllable outputs for generating respective dependent entry controllable duty cycles;

a plurality of power supply modules coupled to said bus and said pulse width modulation circuit, each module coupled to a respective one of said plurality of independently controllable outputs, each module having a primary winding and a secondary winding, each secondary winding coupled to a rectifier circuit, each rectifier circuit coupled in series, each primary winding having a voltage controlled by said pulse width modulation circuit, whereby said pulse width modulation circuit sequentially increasing a first duty cycle of a first one of said plurality of independently controllable outputs until a predetermined duty cycle is reached, thereafter increasing a second duty cycle of a second one of said plurality of independently controllable outputs until a predetermined voltage is obtained.

2. A power supply circuit as recited in claim 1 wherein each of said power supply modules comprise a bridge inverter.

3. A power supply circuit as recited in claim 1 wherein each of the plurality of power supply modules comprise a first switch and a second switch coupling said primary winding to said input line.

4. A power supply circuit as recited in claim 3 wherein said first switch and said second switch having a respective first control input and a second control input, said first control input and said second control input coupled to a square wave generator generating a first square wave signal.

5. A power supply circuit as recited in claim 4 wherein said square generator generating a second square wave signal.

6. A power supply circuit as recited in claim 5 wherein said first square wave signal and said second square wave signal are 180 degrees out of phase.

7. A power supply circuit as recited in claim 1 wherein each the plurality of power supply modules comprise a third switch and a fourth switch coupling said primary winding to said bus return, said third switch and said fourth switch having a respective third control input and a fourth control input coupled to said pulse width modulator.

8. A circuit as recited in claim 1 wherein said first duty cycle is substantially 100 percent.

9. A spacecraft comprising:
   a spacecraft housing;
   a voltage bus having an input line and a return line;
   a power supply circuit comprising,
   a pulse width modulation circuit having a plurality of independently controllable outputs;
   a plurality of power supply modules coupled to said bus and said pulse width modulation circuit, each module coupled to a respective one of said plurality of independently controllable outputs, each module having a primary winding and a secondary winding, each secondary winding coupled to a rectifier circuit, each rectifier circuit coupled in series, each primary winding having a voltage controlled by said pulse width modulation circuit,
   said pulse width modulation circuit sequentially increasing a first duty cycle of a first one of said plurality of independently controllable outputs until a first duty cycle is reached, thereafter increasing a second duty cycle of a second one of said plurality of independently controllable outputs until a predetermined voltage is obtained.

10. A spacecraft as recited in claim 9 wherein each of said power supply modules comprise a bridge inverter.

11. A spacecraft as recited in claim 9 wherein each the plurality of power supply modules comprise a first switch and a second switch coupling said primary winding to said input line.

12. A spacecraft as recited in claim 11 wherein said first switch and said second switch having a respective first control input and a second control input, said first control input and said second control input coupled to a square wave generator generating a first square wave signal.

13. A spacecraft as recited in claim 12 wherein said square generator generating a second square wave signal.

14. A spacecraft as recited in claim 13 wherein said first square wave signal and said second square wave signal are 180 degrees out of phase.

15. A spacecraft as recited in claim 9 wherein each the plurality of power supply modules comprise a third switch and a fourth switch coupling said primary winding to said bus return, said third switch and said fourth switch having a respective third control input and a fourth control input coupled to said pulse width modulator.

16. A spacecraft as recited in claim 9 wherein further comprising an ion engine comprising a gas source, an anode, a cathode, and a screen, wherein said power supply is coupled to said screen.

17. A spacecraft as recited in claim 16 wherein said gas source comprises a xenon gas source.

18. A spacecraft as recited in claim 9 wherein said first duty cycle is substantially 100 percent.

19. A method for controlling a power supply circuits having at least a first inverter circuit and a second inverter circuit, said method comprising the steps of:
   controlling a first inverter circuit using a first output signal of a pulse width modulating circuit, said first output signal having a first duty cycle;
   increasing the first duty cycle;
   after the first circuit is operating at a substantially 100 percent duty cycle, controlling a second inverter circuit using a second output signal of a pulse width modulating circuit, said second output signal having a second duty cycle;
   increasing the second duty cycle to attain a predetermined voltage.

20. A method as recited in claim 19 further comprising the step of rectifying the output of the first inverter circuit when the first duty cycle is less than about 100 percent.

21. A method as recited in claim 19 further comprising the step of rectifying the output of the second inverter circuit when the second duty cycle is less than about 100 percent.

22. A method as recited in claim 19 further comprising the step of coupling a first and second switch to an input line of a bus and to a primary winding of a first transformer.

23. A method as recited in claim 19 further comprising the step of alternately operating said first switch and said second switch.

24. A method as recited in claim 19 further comprising the step of coupling a third and fourth switch to a return line of a bus and to a primary winding of a first transformer.

* * * * *